J. KRAVCAK.
SPRING TIRE.
APPLICATION FILED OCT. 7, 1913.

1,109,995.

Patented Sept. 8, 1914.

2 SHEETS—SHEET 1.

WITNESSES

INVENTOR,
John Kravcak,
BY
ATTORNEY

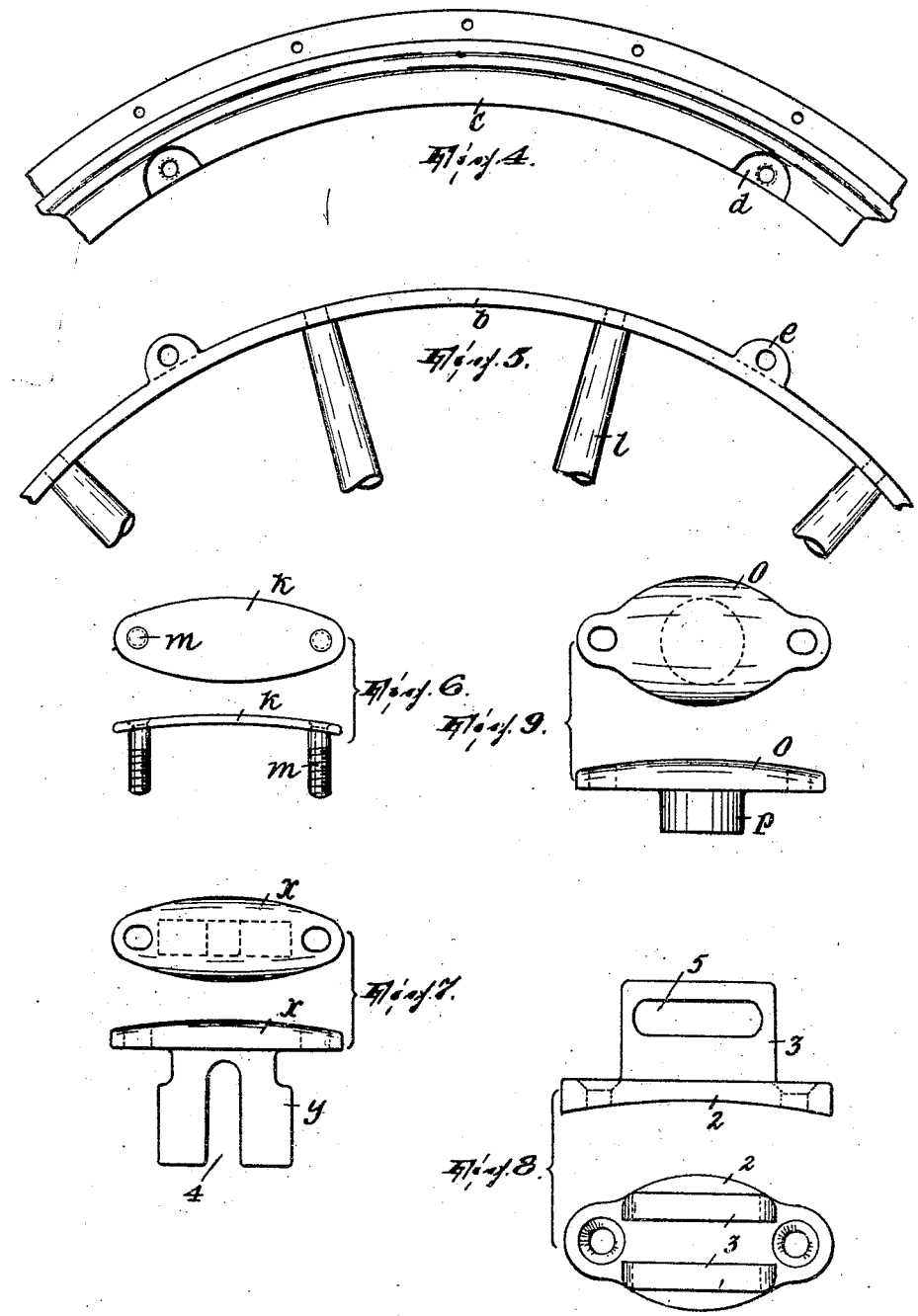

UNITED STATES PATENT OFFICE.

JAHN KRAVCAK, OF PATERSON, NEW JERSEY.

SPRING-TIRE.

1,109,995.

Specification of Letters Patent.

Patented Sept. 8, 1914.

Application filed October 7, 1913. Serial No. 793,862.

*To all whom it may concern:*

Be it known that I, JAHN KRAVCAK, a subject of the Emperor of Austria-Hungary, residing at Paterson, in the county of Passaic and State of New Jersey, have invented certain new and useful Improvements in Spring-Tires, of which the following is a specification.

This invention relates to spring tires of the class in which spaced inner and outer annular members are normally maintained in concentricity with each other by a system of elastic means arranged between them, and it consists principally in certain improvements in the means employed in such tire structures for maintaining the said members against relative lateral displacement, while allowing them to shift out of concentricity in the yielding of said elastic means.

Figure 1:
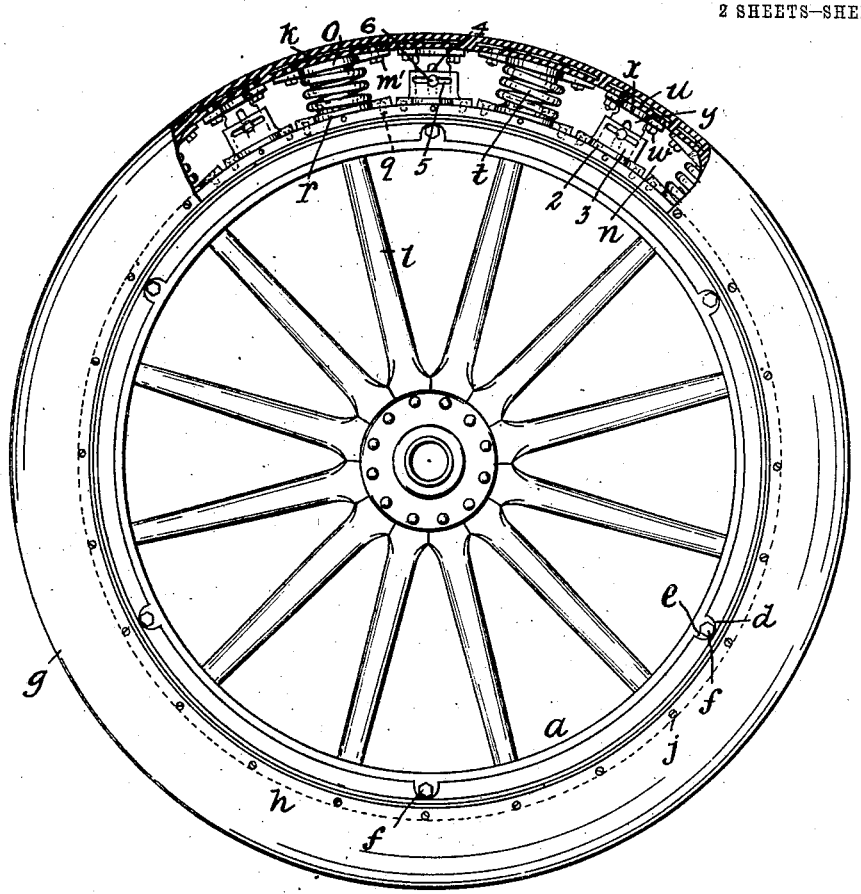
Figure 2:
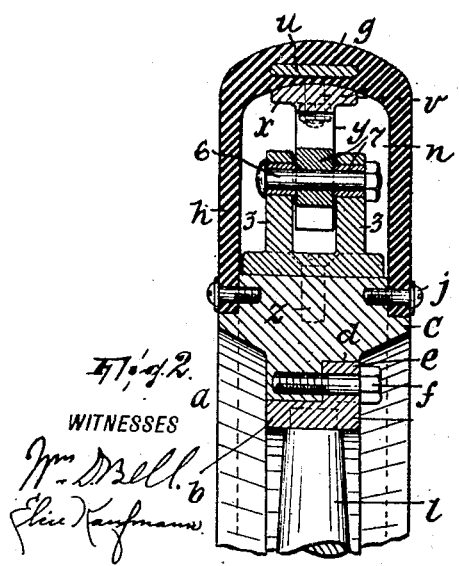
Figure 3:
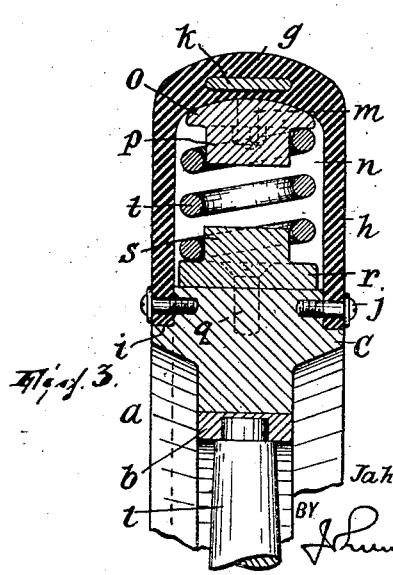

In the accompanying drawing, Figure 1 is a side elevation of a wheel provided with the improved tire, which is shown partly in section; Figs. 2 and 3 are sectional views of the wheel in radii respectively through one of the means for maintaining the tire members against relatively lateral displacement and through one of the elastic means; Figs. 4 and 5 are side elevations of fragments of the wheel and the rim $c$; Fig. 6 shows a detail employed in connection with either the elastic means or the means for maintaining the tire members against lateral displacement; Figs. 7 and 8 show in detail the means for maintaining said tire members against lateral displacement; and Fig. 9 shows in plan and side elevation one of the bearing members $o$.

To the felly $b$ of the wheel $a$ an annular section or rim $c$ is snugly fitted, one of these parts having recesses $d$ and the other lugs $e$ which enter said recesses and coact therewith to interlock the said parts against relative rotary movement. Upon removing the screws $f$ the section $c$ may be withdrawn from the felly $b$ by displacement in the direction of the length of the axis of the wheel.

$g$ is an annular cross-sectionally U-shaped leather or rubber shoe or casing, which may be reinforced in any desired manner, and which is preferably attached to the rim $c$ by the lateral inwardly projecting flanges or side portions $h$ preferably integral with the member $g$, the free edges of said flanges being fitted into rabbets $i$ formed in said rim $c$ and secured therein by the screws $j$ or otherwise. When the wheel is in use and the member $g$ at any radial point of the wheel is by the pressure forced toward rim $c$, the flanges $h$ will bow or bulge more or less, due to their flexibility. The members $c$ and $g$ are kept normally in concentricity with each other by the elastic means shown in the drawings and now to be described: Embedded in the tread portion of the member $g$ is a series of plates $k$ each coincident with a spoke $l$ of the wheel and having a threaded stud $m$ at each end protruding inwardly into the housing $n$ which is formed by the flanged member $g$ and member $c$. Against the inner surface of member $g$ and secured in place by nuts $m'$ on the studs $m$, which penetrate them, are bearing members $o$, each having a boss $p$. Radially opposite each bearing member $o$ and secured to the periphery of the member $c$ by the screws $q$ is another bearing member $r$ having a boss $s$. Between the members of the pairs of bearing members $o$ and $r$ are arranged the spiral springs $t$, kept in place by having their ends fitted over the bosses $p$ and $s$ of said bearing members.

To preserve the wheel members $c$ and $g$ against lateral displacement, while allowing them to shift out of concentricity in the yielding of the springs, I provide the following means: Embedded in the tread of the member $g$ is a series of plates $u$ having inwardly protruding threaded studs $v$ and being otherwise substantially similar to the plates $k$ already described. Penetrated by the studs $v$ and secured in place against the inner surface of the tread of member $g$ by the nuts $w$ on said studs are the plates $x$ having inward projections $y$. Secured to the periphery of the rim $c$ in coincidence with the plates $x$ and by the screws $z$ are the plates 2, each having a pair of outward projections 3 receiving between them the projections $y$. The projections $y$ fit rather snugly between the projections 3, so that the rim member $c$ and casing or shoe member $g$ in effect are interlocked against relatively lateral displacement. The substantially telescoped disposition of the parts $y$ and 3 may be maintained by providing the part $y$ with a slot 4 and the parts 3 with slots 5 at right angles to the slot 4, said slots being penetrated by the bolt 6, which, if desired, may directly penetrate blocks 7 arranged to slide in said slots (Fig. 2). Thus, alternating with the several springs, the wheel members $c$ and $g$ are in effect provided with supports which bear laterally against each other to prevent relatively lateral displacement of said members, while, to an extent limited by the bolts 6, said supports are susceptible of movement circumferentially and radially of the wheel.

Having thus fully described my invention, what I claim as new and desire to secure by Letters Patent is:

In a vehicle wheel, the combination of a rigid annular rim, a tire formed of yielding material and surrounding the rim, said tire being open continuously on the inside, having its edges secured to the rim, and forming with the latter a continuous space, elongated plates arranged in a series around the axis of the wheel and each extending longitudinally of and embedded in and wholly enveloped by the tread portion of the tire and having at each end a threaded stud protruding from said tire radially inwardly, bearing members $o$ arranged within said space against the inner face of the tire each opposite a plate and penetrated by the studs thereof, nuts screwed on said studs and holding each bearing member against the inner face of the tire, other bearing members $r$ fixed respectively opposite the first bearing members to the rim, the bearing members $o$ and $r$ respectively having inwardly and outwardly projecting bosses, and spiral springs arranged between each two bearing members $o$ and $r$ and each fitted at its ends over the bosses thereof.

In testimony whereof I affix my signature in presence of two witnesses.

JAHN KRAVCAK.

Witnesses:
JOHN W. STEWARD,
WM. D. BELL.

---

Copies of this patent may be obtained for five cents each, by addressing the "Commissioner of Patents, Washington, D. C."